US012226845B2

(12) United States Patent
Lee et al.

(10) Patent No.: US 12,226,845 B2
(45) Date of Patent: Feb. 18, 2025

(54) APPARATUS AND METHOD FOR CLEANING OXIDE FILM

(71) Applicants: DOOSAN ENERBILITY CO., LTD., Changwon-si (KR); PUKYONG NATIONAL UNIVERSITY INDUSTRY-UNIVERSITY COOPERATION FOUNDATION, Busan (KR)

(72) Inventors: Yoon Sang Lee, Changwon-si (KR); Hyun Sang Kong, Changwon-si (KR); Jae Yun Shin, Changwon-si (KR); Sang Myung Cho, Busan (KR); Hyo Jin Baek, Busan (KR); Chang Ik Lee, Busan (KR); Hyeong Chang Ryu, Busan (KR); Kyeong Seob Lim, Busan (KR)

(73) Assignees: DOOSAN ENERBILITY CO., LTD., Changwon (KR); PUKYONG NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 349 days.

(21) Appl. No.: 17/000,565

(22) Filed: Aug. 24, 2020

(65) Prior Publication Data

US 2021/0078095 A1 Mar. 18, 2021

(30) Foreign Application Priority Data

Sep. 18, 2019 (KR) .................. 10-2019-0115021

(51) Int. Cl.
 *B23K 10/00* (2006.01)
 *B23K 9/16* (2006.01)
 (Continued)

(52) U.S. Cl.
 CPC ............ *B23K 10/003* (2013.01); *B23K 9/164* (2013.01); *B23K 9/167* (2013.01); *B23K 35/3602* (2013.01)

(58) Field of Classification Search
 CPC .............. B23K 10/003; B23K 35/3602; B23K 9/013; B23K 9/164; B23K 9/167
 See application file for complete search history.

(56) References Cited

U.S. PATENT DOCUMENTS 3,937,915 A * 2/1976 Matsuo .................. B23K 9/013
 219/68
5,174,875 A * 12/1992 Hurwitt ................. C23C 14/345
 204/298.18
(Continued)

FOREIGN PATENT DOCUMENTS

CN 106735767 B * 6/2019 ........... B23K 35/383
JP 59-76671 * 5/1984 ............. B23K 9/013
(Continued)

OTHER PUBLICATIONS

Machine translation of JP2003181679A: Doge, Method for Welding, Method and Apparatus for Removing Coating Material, 2003 (Year: 2003).*

(Continued)

*Primary Examiner* — Dana Ross
*Assistant Examiner* — Abigail H Rhue
(74) *Attorney, Agent, or Firm* — Harvest IP Law, LLP

(57) ABSTRACT

An apparatus and method for cleaning an oxide film using a direct current reverse polarity are provided. The apparatus for cleaning an oxide film formed on a workpiece may include a power supply configured to apply direct current power and to include a positive electrode terminal and a negative electrode terminal, the workpiece configured to be electrically connected to the negative electrode terminal to act as a negative electrode to which a current is applied, and (Continued)

a torch having a positive electrode, which is spaced apart from the oxide film by a predetermined distance and is electrically connected to the positive electrode terminal, the torch being installed to be movable relative to the workpiece. The oxide film formed on the workpiece may be removed by applying a reverse polarity direct current between the workpiece, serving as the negative electrode, and the positive electrode to generate an arc.

17 Claims, 9 Drawing Sheets

(51) Int. Cl.
    *B23K 9/167*          (2006.01)
    *B23K 35/36*          (2006.01)

(56) References Cited

U.S. PATENT DOCUMENTS

| | | | | |
|---|---|---|---|---|
| 8,357,876 | B1* | 1/2013 | Allford | B23K 9/0213 |
| | | | | 219/136 |
| 2007/0045238 | A1* | 3/2007 | Tuttle | B23K 9/164 |
| | | | | 219/75 |
| 2017/0355044 | A1* | 12/2017 | Mukai | B23K 35/0266 |
| 2018/0354057 | A1* | 12/2018 | Sigl | B23K 9/295 |
| 2019/0232410 | A1* | 8/2019 | Kitagawa | B23K 5/22 |
| 2019/0299314 | A1* | 10/2019 | Miklos | B23K 9/013 |

FOREIGN PATENT DOCUMENTS

| | | | | | |
|---|---|---|---|---|---|
| JP | 2003181679 | A | * | 7/2003 | |
| JP | 2009028763 | A | * | 2/2009 | ......... B23K 37/0282 |
| JP | 2016163903 | A | * | 9/2016 | |
| KR | 20120074147 | A | * | 12/2010 | |
| KR | 1020130017397 | A | | 2/2013 | |
| KR | 1020140067348 | A | | 6/2014 | |

OTHER PUBLICATIONS

Machine translation of CN-106735767: Li, Semi-automatic hot wire argon arc welding process of pipe and auxiliaries in boiler heating surface pipe system, 2017 (Year: 2017).*
Machine translation of KR-20120074147: An, Tandem Electro Gas Arc Welding Device, 2010 (Year: 2010).*
Machine translation of JP-2009028763: Miyake, Torch position control device ,2009 (Year: 2009).*
Machine translation of JP-59-76671: Miura, Working method of metal, 1984 (Year: 1984).*
Machine translation JP2016163903: Horikiriof Torch nozzle for narrow groove and welding method, 2016 (Year: 2016).*
Office Action issued by Korea Patent Office on Nov. 25, 2020.

* cited by examiner

Weight change according to current

Length change according to current

5mm

8mm

12mm

16mm

APPARATUS AND METHOD FOR CLEANING OXIDE FILM

CROSS-REFERENCE TO RELATED APPLICATION

This application claims priority to Korean Patent Application No. 10-2019-0115021, filed on Sep. 18, 2019, the disclosure of which is incorporated herein by reference in its entirety.

BACKGROUND

Technical Field

Apparatuses and methods consistent with exemplary embodiments relate to an apparatus and method for cleaning an oxide film, and more particularly, to an apparatus and method for cleaning an oxide film using a direct current reverse polarity.

Description of the Related Art

Welding materials such as Inconel 690 are used to weld different types of materials in manufacturing main equipment for nuclear power plants. Inconel is an alloy material obtained by adding chromium, aluminum, titanium, etc., to nickel, and has excellent heat resistance and corrosion resistance to the extent that its properties, such as elongation rate and tensile strength, do not change even in the order of 600° C. Accordingly, Inconel is used in various fields, for example, for nuclear power plants, crude-mining equipment, and marine equipment. Furthermore, Inconel 690 has twice the chromium content of Inconel 600, thereby exhibiting better corrosion resistance. Accordingly, Inconel 690 has been applied, inter alia, to the Shin-Gori numbers 3 and 4 power plants, the APR1400 exported to the United Arab Emirates (UAE), and so on.

Meanwhile, if a multi-layer welding is performed with this welding material by gas tungsten arc welding (hereinafter, referred to as "GTAW"), a dense oxide film with strong adhesion is formed on a surface of each layer of a weld bead. If the oxide film attached to the surface of the layer of the weld bead is not removed before welding a next layer, this oxide film is incorporated into weld metal, which may lead to weld defects (UT defects). Therefore, it is required to remove the oxide film from each layer in order to avoid the oxide-film-related defects.

In order to remove oxide films, a method of performing interlayer grinding on each layer of a weld bead has been used. That is, an operator removes oxide films by grinding an edge of each layer to a predetermined thickness with a hand grinder. In this method, there are concerns about an operator's musculoskeletal system and a safety accident due to damage to grindstones. In addition, because a height of the bead is decreased due to every pass grinding, a total number of stacked passes is significantly increased, which may lead to an increase in production cost and an increase in time required for work.

SUMMARY

Aspects of one or more exemplary embodiments provide an apparatus and method for cleaning an oxide film, which are capable of rapidly removing an oxide film formed in a working process, for example, an oxide film formed on a weld bead during GTAW, without shaving a bead surface.

Additional aspects will be set forth in part in the description which follows and, in part, will become apparent from the description, or may be learned by practice of the exemplary embodiments.

According to an aspect of an exemplary embodiment, there is provided an apparatus for cleaning an oxide film formed on a workpiece including: a power supply configured to apply direct current power and to include a positive electrode terminal and a negative electrode terminal, the workpiece configured to be electrically connected to the negative electrode terminal to act as a negative electrode to which an electric current is applied, and a torch having a positive electrode, which is spaced apart from the oxide film by a predetermined distance and is electrically connected to the positive electrode terminal, the torch being installed to be movable relative to the workpiece, wherein the oxide film formed on the workpiece may be removed by applying a reverse polarity direct current between the workpiece, serving as the negative electrode, and the positive electrode to generate an arc.

The torch may include a torch body, and a nozzle installed on the torch body to inject shield gas in a form of a laminar flow.

The torch may further include a cooler to cool the positive electrode by water cooling.

The workpiece may be a weld bead formed during gas tungsten arc welding, and the apparatus may further include a drive device configured to transport the torch along the weld bead.

The drive device may have a torch travel speed of 20 to 30 cm/min.

The positive electrode may have an exposed length ($L_s$) that satisfies following conditional expression 1:

$$5 < L_s < 12 \text{ mm}. \quad \text{[Conditional Expression 1]}$$

The positive electrode may be a tungsten electrode.

According to an aspect of another exemplary embodiment, there is provided a method of cleaning an oxide film using the apparatus for cleaning the oxide film formed on a workpiece, the method including: positioning the positive electrode on the oxide film, such that an exposure length ($L_s$) of the positive electrode and an arc gap ($G_a$) between the oxide film and the positive electrode satisfy following conditional expression 2:

$$5 < L_s < 12 \text{ mm; and}$$

$$1.5 \leq G_a \leq 2.5 \text{ mm}, \quad \text{[Conditional Expression 2]}$$

and applying, by the power supply, a reverse polarity direct current of a predetermined ampere to the positive electrode and the negative electrode in an inert gas atmosphere, wherein the oxide film formed on the workpiece may be removed by applying the reverse polarity direct current.

The reverse polarity direct current may be 30 A or more.

The torch may include a torch body, and a nozzle installed on the torch body to inject shield gas in a form of a laminar flow.

The torch may further include a cooler to cool the positive electrode by water cooling.

The workpiece may be a weld bead formed during gas tungsten arc welding, and the apparatus may further include a drive device configured to transport the torch along the weld bead.

The drive device may have a torch travel speed of 20 to 30 cm/min.

The positive electrode may have an exposed length (Ls) that satisfies following conditional expression 1:

$5 < Ls < 12$ mm; and    [Conditional Expression 1]

The positive electrode may be a tungsten electrode.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1A:
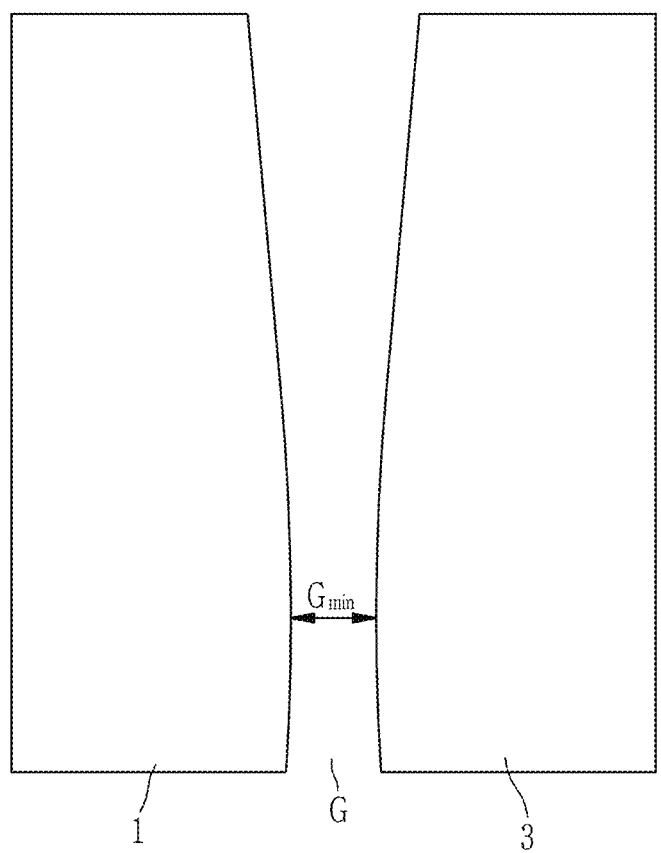
FIG. 1A is a transverse cross-sectional view illustrating a narrow gap groove in an ultra-thick-plate-shaped base metal.

Various modifications and various embodiments will be described below in detail with reference to the accompanying drawings so that those skilled in the art can easily carry out the disclosure. It should be understood, however, that the various embodiments are not for limiting the scope of the disclosure to the specific embodiment, but they should be interpreted to include all modifications, equivalents, and alternatives of the embodiments included within the spirit and scope disclosed herein.

The terminology used herein is for the purpose of describing specific embodiments only and is not intended to limit the scope of the disclosure. The singular expressions "a", "an", and "the" are intended to include the plural expressions as well unless the context clearly indicates otherwise. In the disclosure, terms such as "comprises", "includes", or "have/has" should be construed as designating that there are such features, integers, steps, operations, components, parts, and/or combinations thereof, not to exclude the presence or possibility of adding of one or more of other features, integers, steps, operations, components, parts, and/or combinations thereof.

Hereinafter, exemplary embodiments will be described in detail with reference to the accompanying drawings. In order to clearly illustrate the disclosure in the drawings, parts irrelevant to the description may be omitted, and like reference numerals refer to like elements throughout the specification.

Figure 1B:
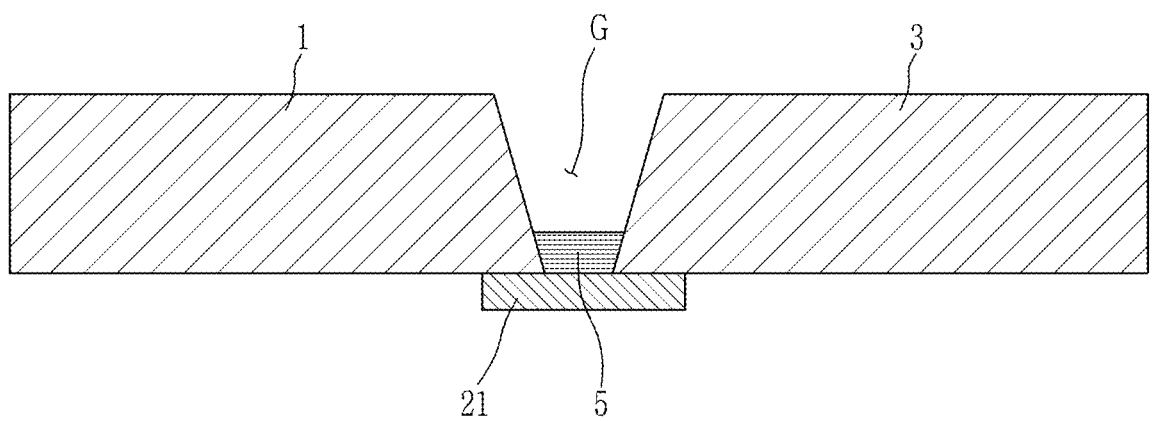
FIG. 1B is a transverse cross-sectional view illustrating a base metal used in an exemplary embodiment.

FIG. 1A is a transverse cross-sectional view illustrating a narrow gap groove in an ultra-thick-plate-shaped base metal. FIG. 1B is a transverse cross-sectional view illustrating a base metal used in an exemplary embodiment. Referring to FIGS. 1A and 1B, the base metal to be welded includes a first base metal 1 and a second base metal 3, which are arranged adjacent to each other, with a predetermined gap G therebetween. The first base metal 1 may be made of STS 304, and the second base metal 3 may be made of Inconel 690. In addition, a minimum gap $G_{min}$ between the first and second base metals 1 and 3 may be a narrow width of about 8 mm. A multi-layered workpiece 5 is formed by stacking a filler metal on the base metal to be welded through GTAW. Here, a backing bar 21 may be disposed beneath the gap G for GTAW.

While each layer of the workpiece 5 is welded and cooled, an oxide film is formed as a surface of each layer of a weld bead corresponding to the workpiece 5 is exposed to the atmosphere. The exemplary embodiment is for the purpose of removing the oxide film formed in the narrow gap.

Figure 2:
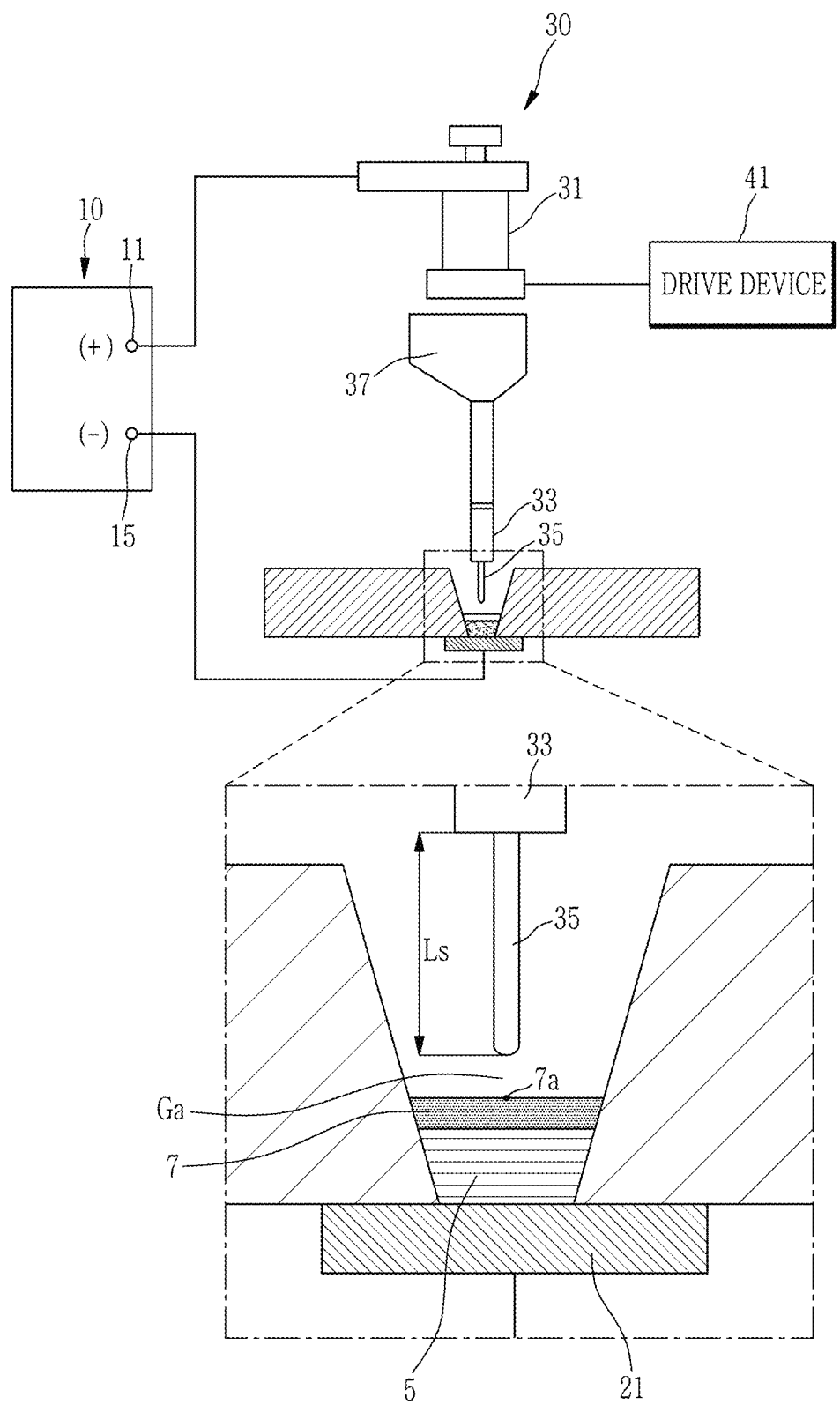
FIG. 2 is a view schematically illustrating an apparatus for cleaning an oxide film according to an exemplary embodiment.
Figure 3:
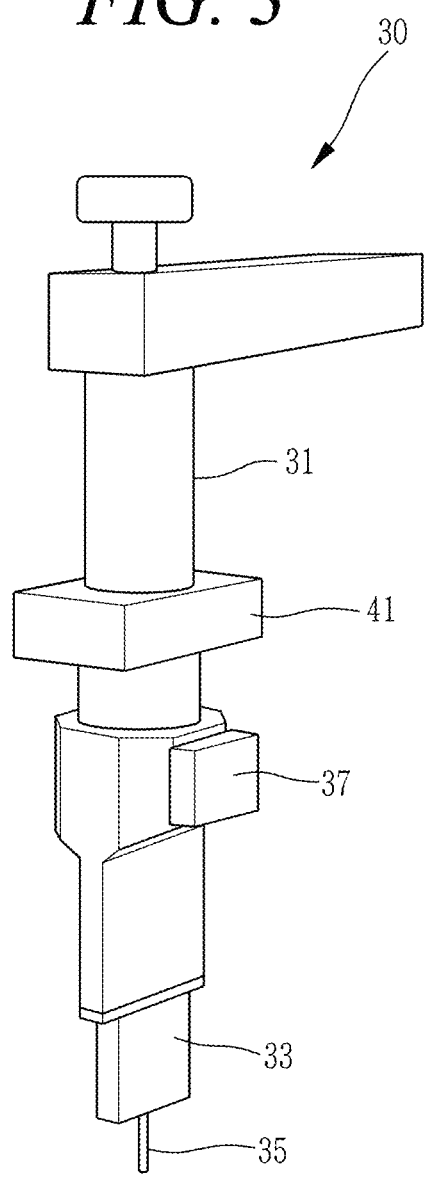
FIG. 3 is a perspective view illustrating a torch having a cooler in the apparatus for cleaning an oxide film according to an exemplary embodiment.

FIG. 2 is a view schematically illustrating an apparatus for cleaning an oxide film according to an exemplary embodiment. FIG. 3 is a perspective view illustrating the torch of FIG. 2.

Referring to FIG. 2, the apparatus for cleaning an oxide film according to an exemplary embodiment that removes an oxide film 7 formed on a workpiece 5 may include a power supply 10, a backing bar 21, and a torch 30. Here, the workpiece 5 may be a multi-layered weld bead formed while gas tungsten arc welding (GTAW) is performed on a base metal. FIG. 2 illustrates that the oxide film 7 is formed on an uppermost surface of the workpiece 5, but it is understood that this is only an example and other exemplary embodiments are not limited thereto. For example, the oxide film may be formed on a surface of each layer of the weld bead. In this case, a process of removing a corresponding oxide film is performed before welding a next layer after each layer of the weld bead is formed.

The power supply 10 for applying direct current (DC) power may include a positive electrode terminal 11 and a negative electrode terminal 15. The backing bar 21 which is electrically connected to the negative electrode terminal 15 is installed to apply an electric current to the workpiece 5. Here, a negative electrode is formed by an entirety of the first and second base metals 1 and 3, the workpiece 5, the oxide film 7, and the backing bar 21.

Referring to FIGS. 2 and 3, the torch 30 including a positive electrode 35 is installed to be movable relative to the workpiece 5. That is, if the workpiece 5 is formed in a longitudinal direction of the gap G between the first and second base metals 1 and 3, as illustrated in FIG. 1B, the torch 30 is installed to be movable in the longitudinal direction of the gap G. To this end, the apparatus according to the exemplary embodiment may include a drive device 41 that transports the torch 30 toward the weld bead, namely in the longitudinal direction of the gap G.

The torch 30 may further include a torch body 31 and a nozzle 33. The nozzle 33 may have an elongated shape in the longitudinal direction of the gap to be freely movable within the narrow gap groove.

The nozzle 33 is installed on the torch body 31 to inject shield gas in a form of a laminar flow. The nozzle 33 may be made of a material such as copper. The positive electrode 35 is fixed by a collet (not shown) provided in the torch body 31, and an exposed length Ls of the positive electrode 35 is adjustable by the collet.

The torch 30 may further include a cooler 37 to cool the positive electrode 35 by water cooling. The cooler 37 has a structure for cooling the positive electrode 35, thereby preventing the positive electrode 35 from melting by arc heat.

The positive electrode 35 which is spaced apart from the oxide film 7 by a predetermined distance Ga is electrically connected to the positive electrode terminal 11. The positive electrode 35 may be a tungsten electrode.

The apparatus according to the exemplary embodiment removes the oxide film 7 formed on the workpiece 5 by applying a reverse polarity direct current to the oxide film 7 through the negative electrode and the positive electrode 35. That is, in an inert gas atmosphere, the power supply 10 applies a reverse polarity direct current of a predetermined ampere to the positive electrode 35 and the negative electrode. The inert gas atmosphere may be formed by injecting argon (Ar) gas, in a predetermined amount, into a portion intended to remove the oxide film.

Here, the negative electrode may be a cold cathode with low temperature. The cold cathode is energized by the action of an electric field, thereby emitting electrons. In this case, the oxide film at a cold cathode spot 7a is removed while electrons are preferentially emitted from the oxide or the like with a low work function. The cold cathode spot 7a refers to a position on the oxide film, which faces an end of the positive electrode 35, with an arc gap Ga therebetween. The end of the positive electrode 35 may have a round shape. The cold cathode spot 7a moves unstably at a high speed during the removal of the oxide film. The high-speed movement of the cold cathode spot 7a is attributable to the property that the cold cathode spot 7a moves to a region with a low work function due to a difference between fine protrusions or oxide layers, a difference in density between various alloy elements, or the like. That is, once electrons are emitted, the oxide at a corresponding position has an increased work function while decaying, resulting in a difficulty in emitting electrons. Therefore, the cold cathode spot moves to another position with a low work function, so that the oxide film is removed from the cold cathode spot moved to that position.

The apparatus for cleaning an oxide film according to the exemplary embodiment is for the purpose of maximizing the removal efficiency of the oxide film. The following experiments show oxide film cleaning performance according to a travel speed of the torch 30 by the drive device 41, the exposed length Ls of the positive electrode 35, a size of the arc gap Ga, and an application of different currents, and an optimum range for oxide film cleaning is derived from these experiments.

Experimental Example

Cleaning Experiment for Change in Arc Gap (Experiment 1)

Table 1 illustrates cleaning conditions for confirming a cleaning effect according to the application of different arc gaps. Referring to Table 1, argon (Ar) gas with a purity of 100% is selected as inert gas (i.e., shield gas), and the gas is injected into a cleaning region in an amount of 10 liters per minute. In addition, the travel speed of a positive electrode is set to 10 cm/min, and a reverse polarity current of 20 A or 30 A is applied.

TABLE 1

| Item | Value |
| --- | --- |
| Shield Gas Type | Argon (Ar) 100% |
| Shield Gas Injection | 10 L/min |
| Travel Speed | 10 cm/min |
| Current | 20 A/30 A |

Figure 4A:
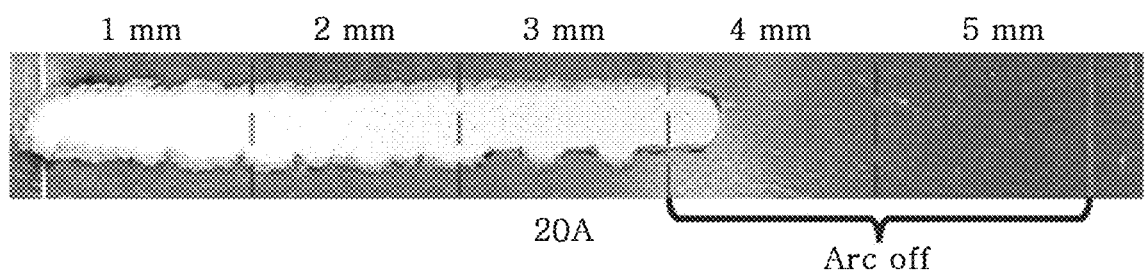
FIGS. 4A and 4B are photographs illustrating a result of cleaning according to the application of different current-specific arc gaps.
Figure 4B:
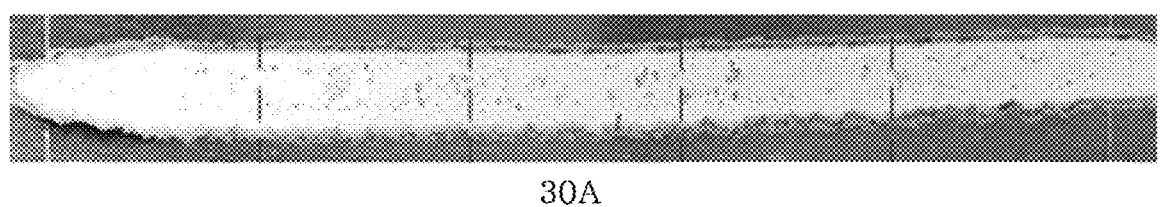

FIGS. 4A and 4B are photographs illustrating a result of cleaning according to the application of different current-specific arc gaps under the conditions of Table 1.

FIG. 4A illustrates a result of cleaning while increasing the length of the arc gap from 1 mm to 5 mm at a current of 20 A. FIG. 4B illustrates a result of cleaning while increasing the length of the arc gap from 1 mm to 5 mm at a current of 30 A. Referring to FIG. 4A, it can be seen that the arc is extinguished and the cleaning is thus not performed, while the length of the arc gap is increased to 4 mm. Referring to FIG. 4B, it can be seen that the arc is not extinguished throughout all sections, and the cleaning is thus performed, thereby exhibiting excellent workability. Therefore, it can be seen that a cleaning width increases at the high current.

In the experiment of cleaning according to the application of different arc gaps, the arc is extinguished as the arc gap is increased from 3 mm to 4 mm. Therefore, it is determined that if the arc gap is 3 mm or more, there is a risk that the arc is extinguished. That is, if the arc gap is 3 mm or more, it is difficult to produce a uniform result during welding. Thus, it is preferable that the arc gap be 2.5 mm or less.

In addition, in the case in which the arc gap is set to 1 mm, the cleaning is smoothly performed, but there is a risk of contact between the electrode and the base metal due to a short distance between the end of the electrode and the base metal. In view of this, the positive electrode is preferably positioned on the oxide film such that the arc gap Ga between the oxide film and the positive electrode is from 1.5 mm to 2.5 mm.

As described above, in the relationship between the cleaning widths according to the length of the arc gap and the current, it can be seen that the cleaning width decreases as the length of the arc gap increases, and the cleaning width increases as the current is high.

Cleaning Experiment for Change in Applied Current (Experiment 2)

Table 2 illustrates cleaning conditions for confirming a cleaning effect according to the application of different currents by a power supply. Referring to Table 2, argon (Ar) gas with a purity of 100% is selected as inert gas (i.e., shield gas), and the gas is injected into a cleaning region in an amount of 10 liters per minute. In addition, the travel speed of a torch is set to 25 cm/min, the exposed length of a positive electrode is set to 8 mm, and an arc length is set to 1.5 to 2.5 mm.

TABLE 2

| Item | Value |
| --- | --- |
| Shield Gas Type | Argon (Ar) 100% |
| Shield Gas Injection | 10 L/min |
| Exposed Length of Positive Electrode | 8 mm |
| Arc Length | 1.5 to 2.5 mm |
| Travel Speed | 25 cm/min |

Figure 5:
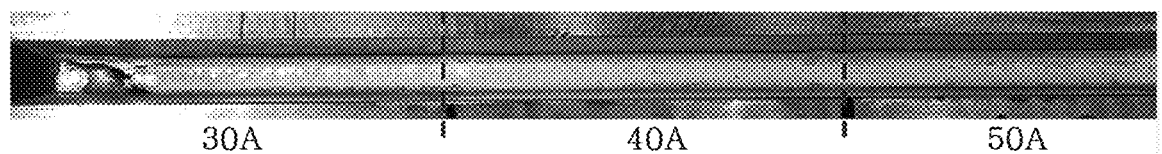
FIG. 5 is a photograph illustrating a result of cleaning according to the application of different currents.

FIG. 5 is a photograph illustrating a result of cleaning according to the application of different currents under the conditions of Table 2. That is, FIG. 5 is a photograph illustrating a weld bead when the cleaning is performed while applying different currents of 30 A, 40 A, and 50 A.

Referring to FIG. 5, it can be seen that the cleaning is performed well at all the applied currents of 30 A, 40 A, and 50 A. A decay rate of the oxide film, which is irregularly formed, increases as the current increases from 30 A to 50 A. The oxide is typically decayed when electrons migrate from the oxide to the electrode. Accordingly, as the current is high, the amount of migration of electrons is increased, thereby causing an increase in the decay rate of the oxide film. Therefore, it is possible to perform the cleaning even at the high travel speed of the torch when the cleaning is performed at a high current.

Figure 6A:
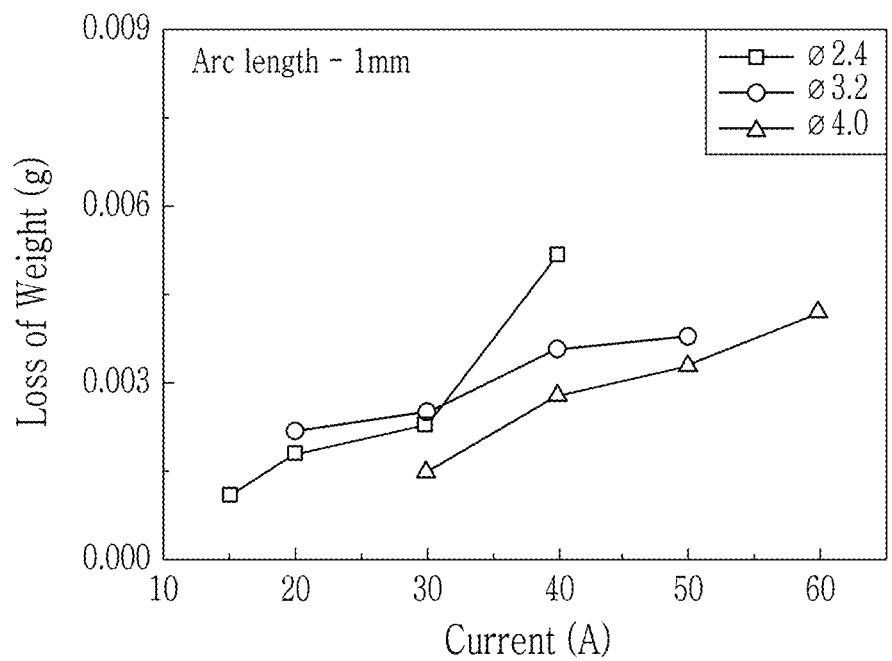
FIGS. 6A and 6B are views illustrating a result of measurement of an electrode after cleaning.
Figure 6B:
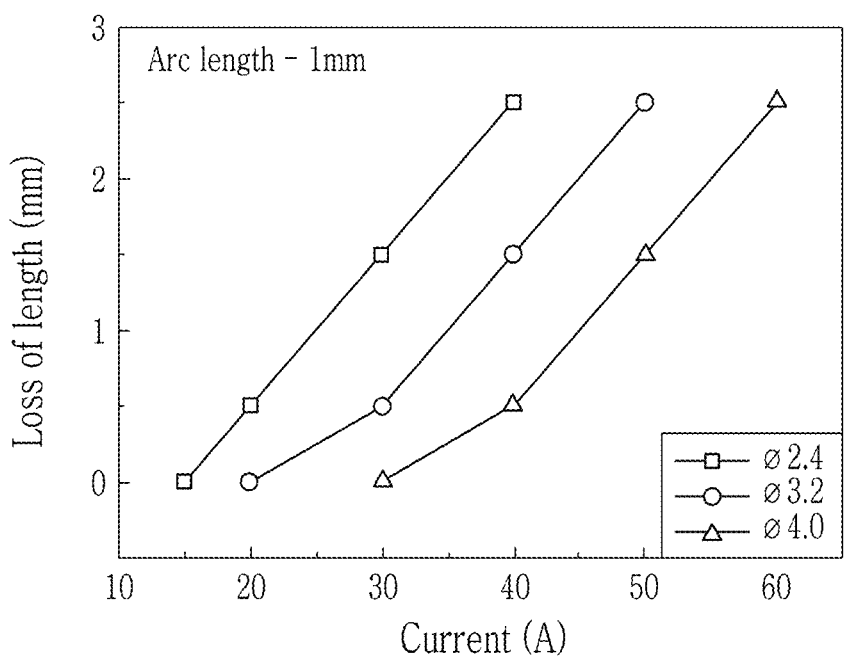

Considering the results of Experiments 1 and 2, it is preferable that the reverse polarity direct current be set to 30 A or more. If the welding is performed at a current lower than 30 A, the travel speed of the torch should be decreased because of a low rate of cleaning, resulting in low productivity. On the other hand, if the cleaning is performed at a current of 50 A or more, as shown in FIGS. 6A and 6B, it can be seen that there is a concern that the cleaning is unstable due to an excessive amount of electrode consumption, which is unecomonical and is apt to easily increase the arc length.

Cleaning Experiment for Change in Travel Speed (Experiment 3)

Table 3 illustrates cleaning conditions for confirming a cleaning effect according to the application of different torch travel speeds. Referring to Table 3, argon (Ar) gas with a purity of 100% is selected as inert gas (i.e., shield gas), and the gas is injected into a cleaning region in an amount of 10 liters per minute. In addition, the exposed length of a positive electrode is set to 8 mm, an arc length, e.g., a size of an arc gap Ga is set to 1.5 to 2.5 mm, and a current of 40 A is applied.

TABLE 3

| Item | Value |
| --- | --- |
| Shield Gas Type | Argon (Ar) 100% |
| Shield Gas Injection | 10 L/min |
| Exposed Length of Positive Electrode | 8 mm |
| Arc Length | 1.5 to 2.5 mm |
| Current | 40 A |

Figure 7:
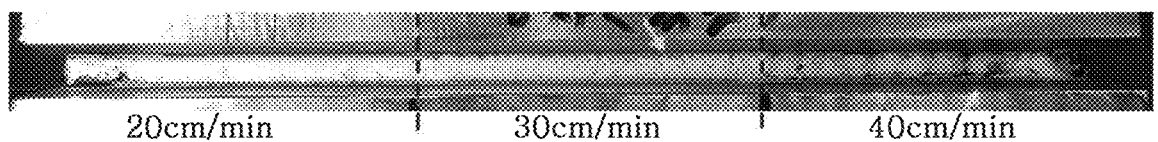
FIG. 7 is a photograph illustrating a result of cleaning according to the application of different torch travel speeds relative to a workpiece.
Figure 8A:
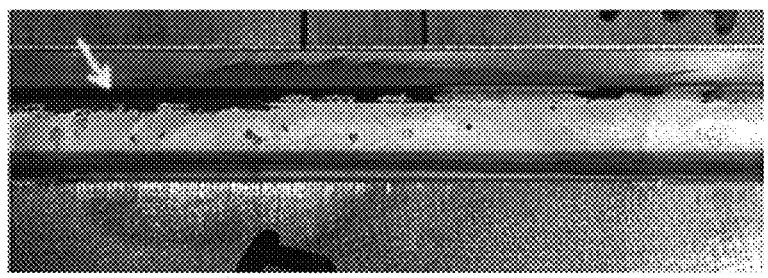
FIGS. 8A to 8D are photographs illustrating a result of cleaning according to the application of different exposed lengths Ls of a positive electrode.
Figure 8B:
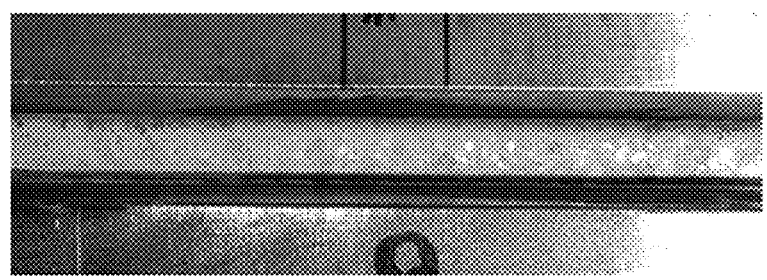
Figure 8C:
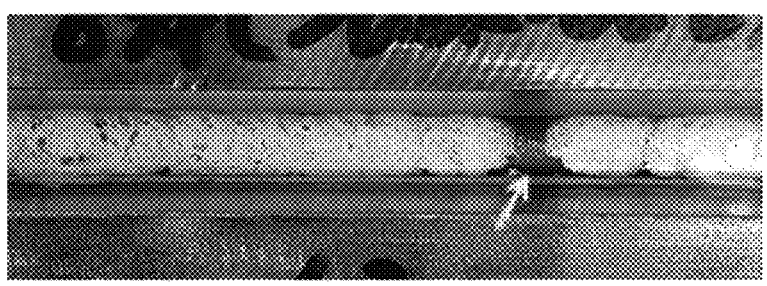
Figure 8D:
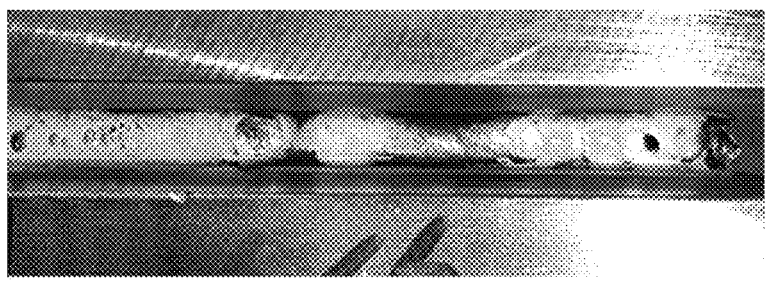

FIG. 7 is a photograph illustrating a weld bead when the cleaning is performed while applying different torch travel speeds of 20 cm/min, 30 cm/min, and 40 cm/min, relative to a workpiece under the conditions of Table 3. Referring to FIG. 7, it can be seen that the cleaning is insufficiently performed at travel speeds of 30 cm/min and 40 cm/min. On the other hand, it can be seen that the effect of cleaning the oxide film is excellent at a travel speed of 20 cm/min. In view of this, the travel speed of the torch 30 by the drive device 41 may be set to be from 20 to 30 cm/min.

Cleaning Experiment for Change in Exposed Length Ls of Positive Electrode (Experiment 4)

Table 4 illustrates cleaning conditions for confirming a cleaning effect according to the application of different exposed lengths Ls of a positive electrode. Referring to Table 4, argon (Ar) gas with a purity of 100% is selected as inert gas (i.e., shield gas), and the gas is injected into a cleaning region in an amount of 10 liters per minute. In addition, the travel speed of a torch is set to 25 cm/min, an arc length, e.g., a size of an arc gap Ga is set to 1.5 to 2.5 mm, and a reverse polarity current of 40 A is applied.

TABLE 4

| Item | Value |
| --- | --- |
| Shield Gas Type | Argon (Ar) 100% |
| Shield Gas Injection | 10 L/min |
| Arc Length | 1.5 to 2.5 mm |
| Travel Speed | 25 cm/min |
| Current | 40 A |

FIGS. 8A to 8D are photographs illustrating a weld bead when the cleaning is performed while applying different exposed lengths Ls of 5, 8, 12, and 16 mm of a positive electrode under the conditions of Table 4. Referring to FIGS. 8A to 8D, it can be seen that the cleaning region is narrow at an exposed length of 5 mm, and the cleaning is unstable due to an occurrence of arc blow at exposed lengths of 12 mm and 16 mm. On the other hand, at an exposed length of 8 mm of FIG. 8B, the cleaning effect is excellent and the arc is stably generated without the arc blow.

In view of this, the exposed length Ls of the positive electrode may be 5 to 12 mm. Preferably, the exposed length Ls of the positive electrode may be set to 8 mm.

Figure 9:
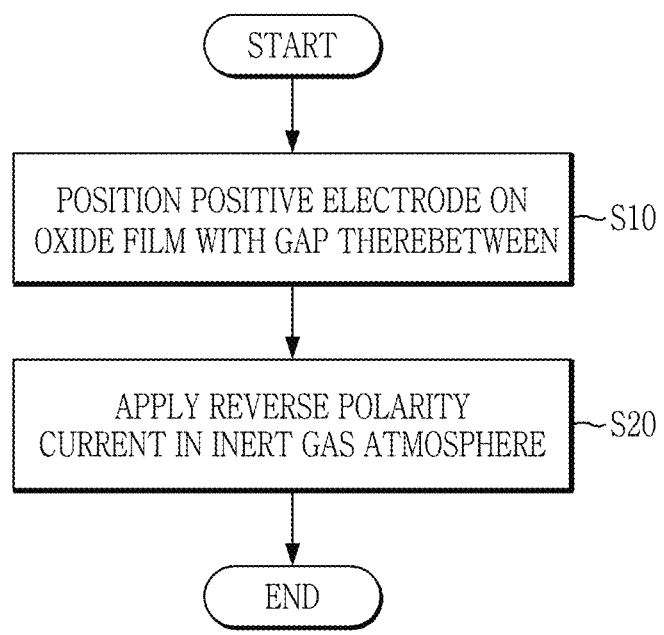
FIG. 9 is a flowchart schematically illustrating a process of cleaning an oxide film according to another exemplary embodiment.

FIG. 9 is a flowchart schematically illustrating a method of cleaning an oxide film according to another exemplary embodiment.

Referring to FIGS. 2 and 9, the positive electrode 35 is positioned on the oxide film 7 (operation S10), such that the exposure length Ls of the positive electrode 35 and the arc gap Ga satisfy the following Equation 1:

$$1.5 \leq Ga \leq 2.5 \text{ mm; and}$$

$$5 < Ls < 12 \text{ mm,} \quad \text{[Equation 1]}$$

where the condition ranges for the exposure length Ls of the positive electrode and the arc gap Ga are set based on the above Experiments 1 and 4.

Next, in the inert gas atmosphere, the power supply 10 applies a reverse polarity direct current of a predetermined ampere to the positive electrode 35 and the negative electrode (operation S20). Thus, it is possible to remove the oxide film formed on the workpiece 5.

Referring to Experiment 2, the reverse polarity direct current may be set to 30 A or more. The inert gas atmosphere may be formed by injecting argon (Ar) gas, in an amount of 10 L/min, into a portion intended to remove the oxide film during the removal of the oxide film.

The apparatus and method for cleaning an oxide film according to the exemplary embodiments can rapidly remove the oxide film formed in the working process, for example, the oxide film formed on the weld bead, using a reverse polarity direct current. That is, it is possible to effectively remove the oxide film while the cleaning is maintained at a speed of 20 to 30 cm/min. Therefore, according to the exemplary embodiment, it is possible to replace the related art method of removing the oxide film by mechanically shaving the bead surface by grinding.

In addition, because the cleaning is performed between the welding passes if the exemplary embodiment is applied to the GTAW, it is possible to continuously perform the welding process and the oxide film removal process.

While one or more exemplary embodiments have been described with reference to the accompanying drawings, it is to be understood by those skilled in the art that various modifications in form and details may be made therein without departing from the sprit and scope as defined by the appended claims. Therefore, the description of the exemplary embodiments should be construed in a descriptive sense and not to limit the scope of the claims, and many alternatives, modifications, and variations will be apparent to those skilled in the art.

What is claimed is:

1. An apparatus for cleaning an oxide film formed on a multi-layered workpiece, comprising:
a power supply configured to apply direct current power and to comprise a positive electrode terminal and a negative electrode terminal;
the multi-layered workpiece configured to be electrically connected to the negative electrode terminal to act as a negative electrode to which an electric current is applied, the multi-layered workpiece being disposed between a first base metal and a second base metal, the multi-layered workpiece being disposed in a narrow gap formed in a longitudinal direction between a first base metal and a second base metal facing the first base metal;
a torch having a positive electrode, which is spaced apart from the oxide film by a predetermined distance and is electrically connected to the positive electrode terminal, the torch being installed to be movable relative to the multi-layered workpiece;
a drive device configured to transport the torch in the longitudinal direction toward the multi-layered workpiece between the first base metal and the second base metal; and
a backing bar disposed adjacent to and beneath the multi-layered workpiece and the first and second base metals wherein an upper side surface of the backing bar is attached to the multi-layered workpiece and a lower side surface of the backing bar is electrically connected to the negative electrode terminal such that the backing bar electrically connects the work piece to the negative terminal,
wherein the oxide film formed on the multi-layered workpiece is removed by applying a reverse polarity direct current between the multi-layered workpiece, serving as the negative electrode, and the positive electrode to generate an arc,
wherein the torch comprises:
a torch body; and
a nozzle installed on the torch body to inject shield gas in a form of a laminar flow in the narrow gap between the first base metal and the second base metal, which are arranged adjacent to and facing each other, to be freely movable within the narrow gap groove, the nozzle having an elongated shape in the longitudinal direction, which is perpendicular to the upper side surface of the backing bar,
wherein each layer of the multi-layered workpiece is a weld bead layer generated by performing a gas tungsten arc welding in the narrow gap formed between the first base metal and the second base metal, the oxide film is formed on an upper surface of one weld bead layer of the multi-layered workpiece after the one weld bead layer is generated, and the oxide film is removed from the upper surface of the one weld bead layer by the applying of the reverse polarity direct current before a subsequent gas tungsten arc welding to generate a subsequent weld bead layer of the multi-layered workpiece is performed.

2. The apparatus according to claim 1, wherein the torch further comprises a cooler disposed between the drive device and the nozzle and configured to cool the positive electrode by water cooling.

3. The apparatus according to claim 2, wherein the positive electrode has an exposed length (Ls) that satisfies following conditional expression $$1:5<Ls<12 \text{ mm} \qquad \text{[Conditional Expression 1]}.$$

4. The apparatus according to claim 1, wherein the drive device has a torch travel speed of 20 to 30 cm/min.

5. The apparatus according to claim 1, wherein the positive electrode has an exposed length (Ls) that satisfies following conditional expression $$1: 5<Ls<12 \text{ mm} \qquad \text{[Conditional Expression 1]}.$$

6. The apparatus according to claim 1, wherein the positive electrode is a tungsten electrode.

7. A method of cleaning an oxide film using the apparatus according to claim 1, the method comprising:
positioning the positive electrode on the oxide film, such that an exposure length (Ls) of the positive electrode and an arc gap (Ga) between the oxide film and the positive electrode satisfy following conditional expression 2; and $$5<Ls<12 \text{ mm; and}$$

$$1.5 \leq Ga \leq 2.5 \text{ mm,} \qquad \text{[Conditional Expression 2]}$$

applying, by the power supply, a reverse polarity direct current of a predetermined ampere to the positive electrode and the negative electrode in an inert gas atmosphere,
wherein the oxide film formed on the multi-layered workpiece is removed by applying the reverse polarity direct current.

8. The method according to claim 7, wherein the reverse polarity direct current is 30 A or more.

9. The method according to claim 8, wherein the positive electrode has an exposed length (Ls) that satisfies following conditional expression $$1:5<Ls<12 \text{ mm} \qquad \text{[Conditional Expression 1]}.$$

10. The method according to claim 7, wherein the torch further comprises a cooler disposed between the drive device and the nozzle and configured to cool the positive electrode by water cooling.

11. The method according to claim 7, wherein the drive device has a torch travel speed of 20 to 30 cm/min.

12. The method according to claim 7, wherein the positive electrode has an exposed length (Ls) that satisfies following conditional expression $$1:5<Ls<12 \text{ mm} \qquad \text{[Conditional Expression 1]}.$$

13. The method according to claim 7, wherein the positive electrode is a tungsten electrode.

14. The apparatus according to claim 1,
wherein the first and second base metal are ultra-thick-plate-shaped base metals, when a thickness of the first and second base metals are measured in the longitudinal direction.

15. The apparatus according to claim 1,
wherein the narrow gap has a width equal to or less than 8 mm when the width of the narrow gap is measured in a direction perpendicular to the longitudinal direction.

16. The apparatus according to claim 1,
wherein the first base metal and the second base metal are made of different materials.

17. The apparatus according to claim 16, wherein the first base metal is made of STS 304 and the second base metal is made of Inconel 690.

\* \* \* \* \*